(12) United States Patent
Yang et al.

(10) Patent No.: US 8,914,029 B2
(45) Date of Patent: Dec. 16, 2014

(54) PROVISIONING OF ADAPTIVE FREQUENCY LIST FOR PSEUDO-FAST RETURN FROM A TARGET CELLULAR COMMUNICATION NETWORK TO A SOURCE CELLULAR COMMUNICATION NETWORK TO USER EQUIPMENT

(71) Applicant: QUALCOMM Incorporated, San Diego, CA (US)

(72) Inventors: Ming Yang, San Diego, CA (US); Tom Chin, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/686,703

(22) Filed: Nov. 27, 2012

(65) Prior Publication Data

US 2014/0148164 A1     May 29, 2014

(51) Int. Cl.
*H04W 36/00*     (2009.01)

(52) U.S. Cl.
CPC ................................ *H04W 36/0083* (2013.01)
USPC ........... 455/436; 455/420; 455/421; 455/437; 455/444; 370/328; 370/331; 370/332

(58) Field of Classification Search
CPC ...... H04W 36/30; H04W 36/18; H04W 36/08
USPC ................ 455/420–422.1, 432.1, 435.1–444, 455/447.2, 448, 452.2, 456.1, 524–525, 455/63.2–63.3, 552.1, 509, 433–434; 370/328–329, 338, 331–332, 320–322, 370/352–354
See application file for complete search history.

(56) References Cited

U.S. PATENT DOCUMENTS

| | | | |
|---|---|---|---|
| 5,640,675 A | 6/1997 | Pinault et al. | |
| 8,072,960 B2 | 12/2011 | Shi et al. | |
| 2002/0105927 A1* | 8/2002 | Holma et al. | 370/331 |
| 2010/0020725 A1* | 1/2010 | Ha et al. | 370/255 |
| 2010/0029233 A1 | 2/2010 | Chu | |
| 2010/0034160 A1 | 2/2010 | Prakash et al. | |
| 2010/0113010 A1* | 5/2010 | Tenny et al. | 455/423 |
| 2011/0039562 A1* | 2/2011 | Balasubramanian et al. | 455/436 |

* cited by examiner

*Primary Examiner* — Babar Sarwar
(74) *Attorney, Agent, or Firm* — Kristine U. Ekwueme

(57) ABSTRACT

A user equipment (UE) is configured to maintain an updated frequency list for pseudo-fast return handover. The UE receives a frequency list for pseudo fast return when the UE is in an idle mode in a first radio access technology (RAT). When the UE is in a connected mode in a second RAT, the list is updated based on actual UE inter- and intra-frequency measurements of the first RAT during mobility.

24 Claims, 7 Drawing Sheets

600 →

602
RECEIVING A FREQUENCY LIST FOR PSEUDO FAST RETURN WHEN IN IDLE MODE IN A FIRST RADIO ACCESS TECHNOLOGY (RAT)

604
UPDATING THE FREQUENCY LIST FOR PSEUDO FAST RETURN TO THE FIRST RAT FROM THE SECOND RAT WHILE IN CONNECTED MODE BASED ON ACTUAL UE INTER AND INTRA FREQUENCY MEASUREMENTS OF EACH SERVING BASE STATION OF THE FIRST RAT DURING MOBILITY

PROVISIONING OF ADAPTIVE FREQUENCY LIST FOR PSEUDO-FAST RETURN FROM A TARGET CELLULAR COMMUNICATION NETWORK TO A SOURCE CELLULAR COMMUNICATION NETWORK TO USER EQUIPMENT

BACKGROUND

1. Field

Aspects of the present disclosure relate generally to wireless communication systems, and more particularly, to updating a frequency list for pseudo fast return from a second radio access technology (RAT) back to a first RAT.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes receiving a frequency list for pseudo fast return when a user equipment (UE) is in the idle mode in a first radio access technology (RAT). The frequency list is updated for pseudo fast return to the first RAT from a second RAT when in connected mode and the updating is based at least in part on actual UE inter and intra frequency measurements of each serving base station of the first RAT during mobility.

Another aspect discloses wireless communication having a memory and at least one processor coupled to the memory. The processor(s) is configured to receive a frequency list for pseudo fast return when a user equipment (UE) is in the idle mode in a first radio access technology (RAT). The processor (s) is also configured to update the frequency list for pseudo fast return to the first RAT from a second RAT when in connected mode. T updating is based at least in part on actual UE inter and intra frequency measurements of each serving base station of the first RAT during mobility.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a frequency list for pseudo fast return when a user equipment (UE) is in the idle mode in a first radio access technology (RAT). The program code also causes the processor(s) to update the frequency list for pseudo fast return to the first RAT from a second RAT when in connected mode. The updating is based at least in part on actual UE inter and intra frequency measurements of each serving base station of the first RAT during mobility.

Another aspect discloses an apparatus including means for receiving a frequency list for pseudo fast return when a user equipment (UE) is in the idle mode in a first radio access technology (RAT). Also included is a means for updating the frequency list for pseudo fast return to the first RAT from a second RAT when the UE is in connected mode. The updating is based at least in part on actual UE inter and intra frequency measurements of each serving base station of the first RAT during mobility.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
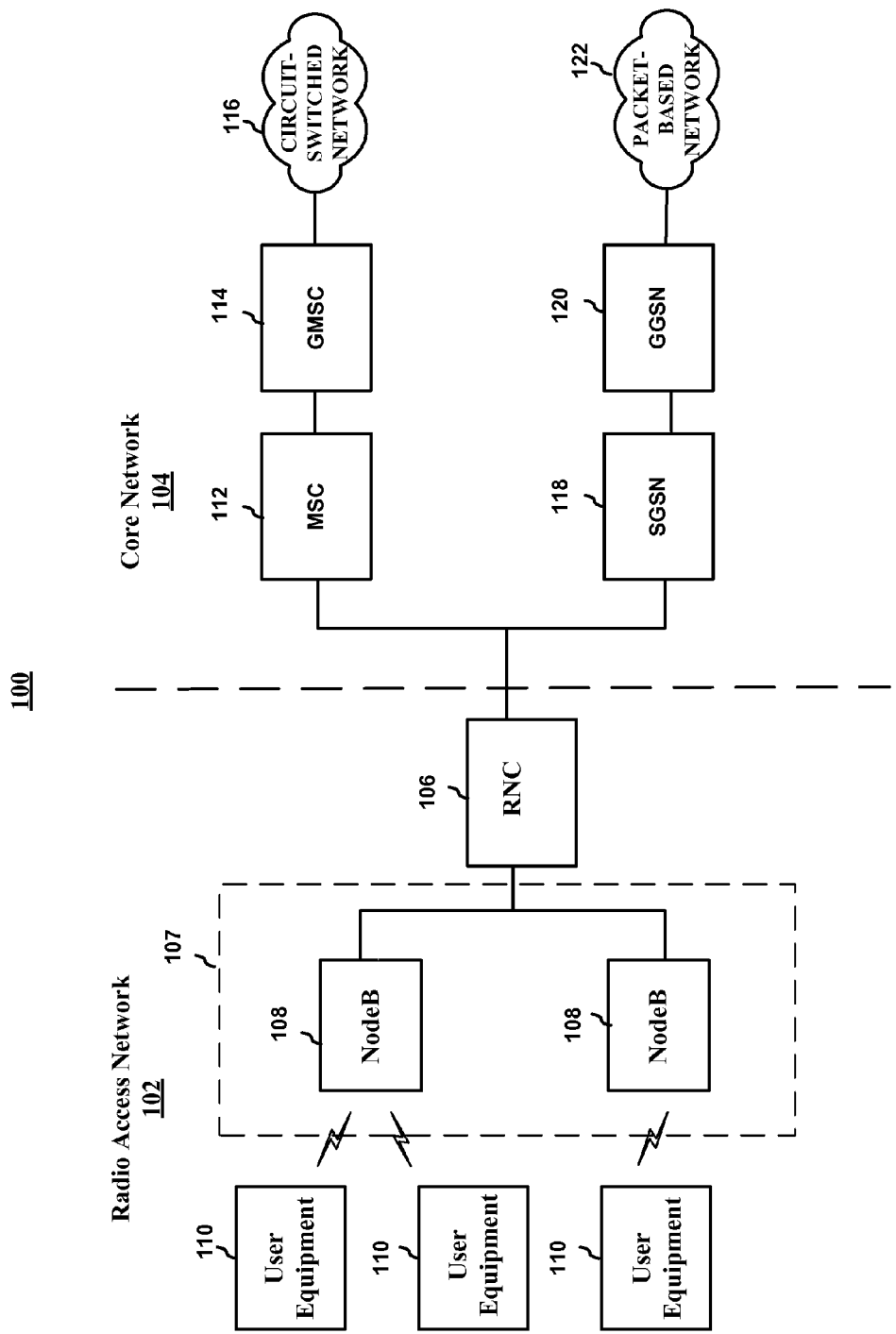
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
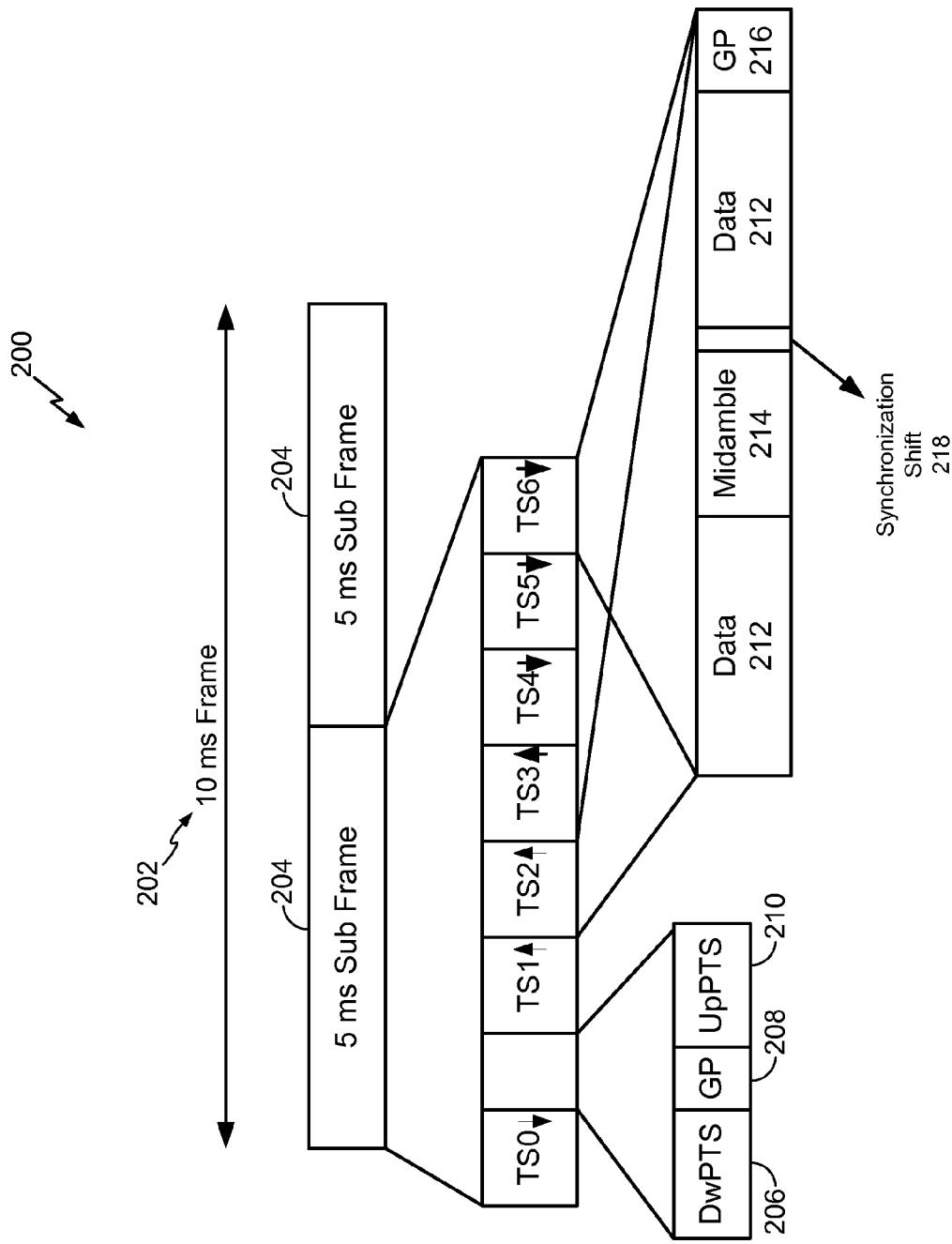
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS)

210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
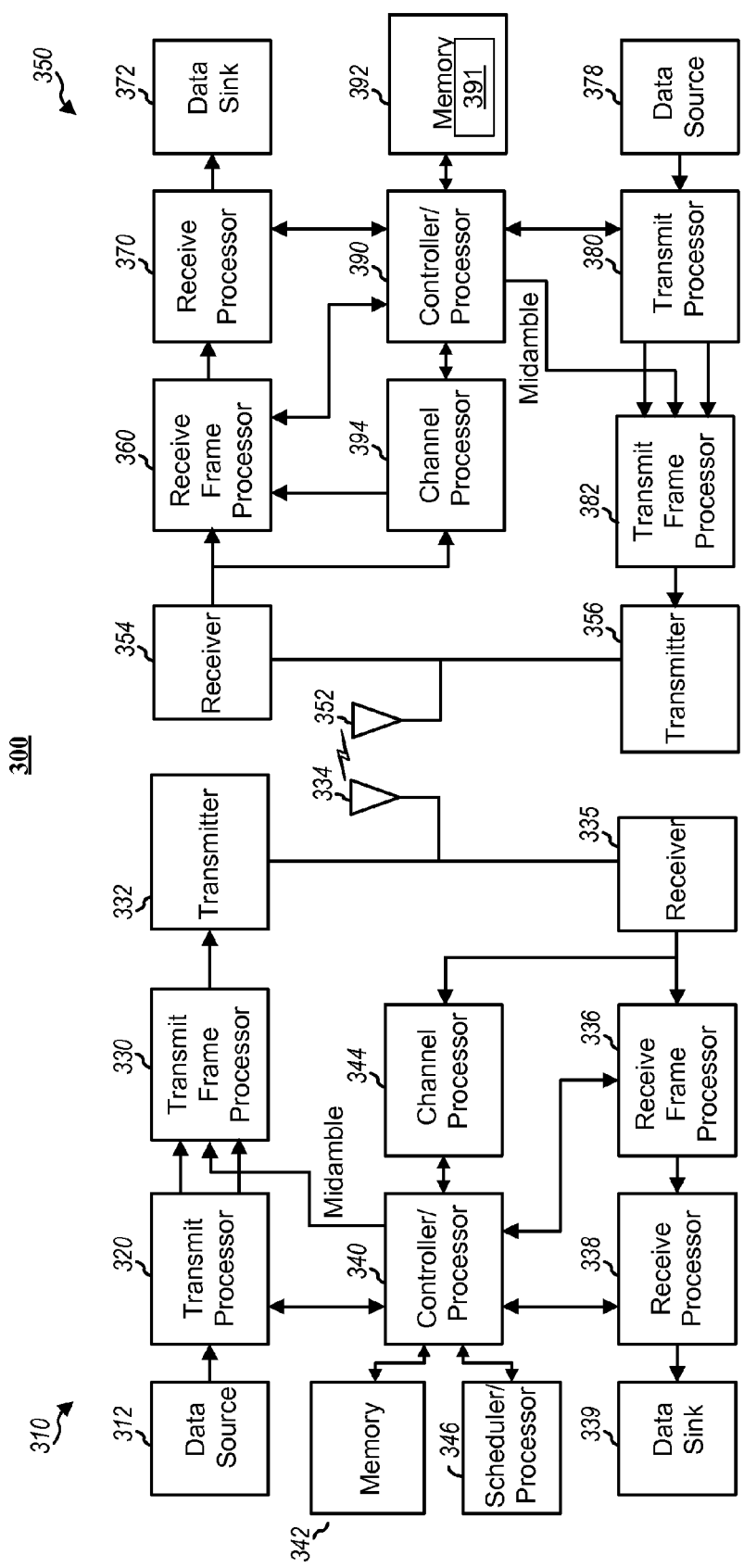
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store an adaptive frequency list module 391 which, when executed by the controller/processor 390, configures the UE 350 for re-acquisition of a radio network or handover to a new radio network in certain situations.

Adaptive Frequency List Determination and Pseudo-Fast Return

Certain UEs may be capable of communicating on multiple radio access technologies (RATs). Such UEs may be referred to as multimode UEs. For example, a multimode UE may be capable of communications on a Universal Terrestrial Radio Access (UTRA) frequency division duplexed (FDD) network such as a Wideband-Code Division Multiple Access (W-CDMA) network, a UTRA time division duplexed (TDD) network such as a Time Division-Synchronous Code Division Multiple Access (TD-SCDMA) network, a Global System for Mobile Communications (GSM) network and/or a Long Term Evolution (LTE) network.

Figure 4:
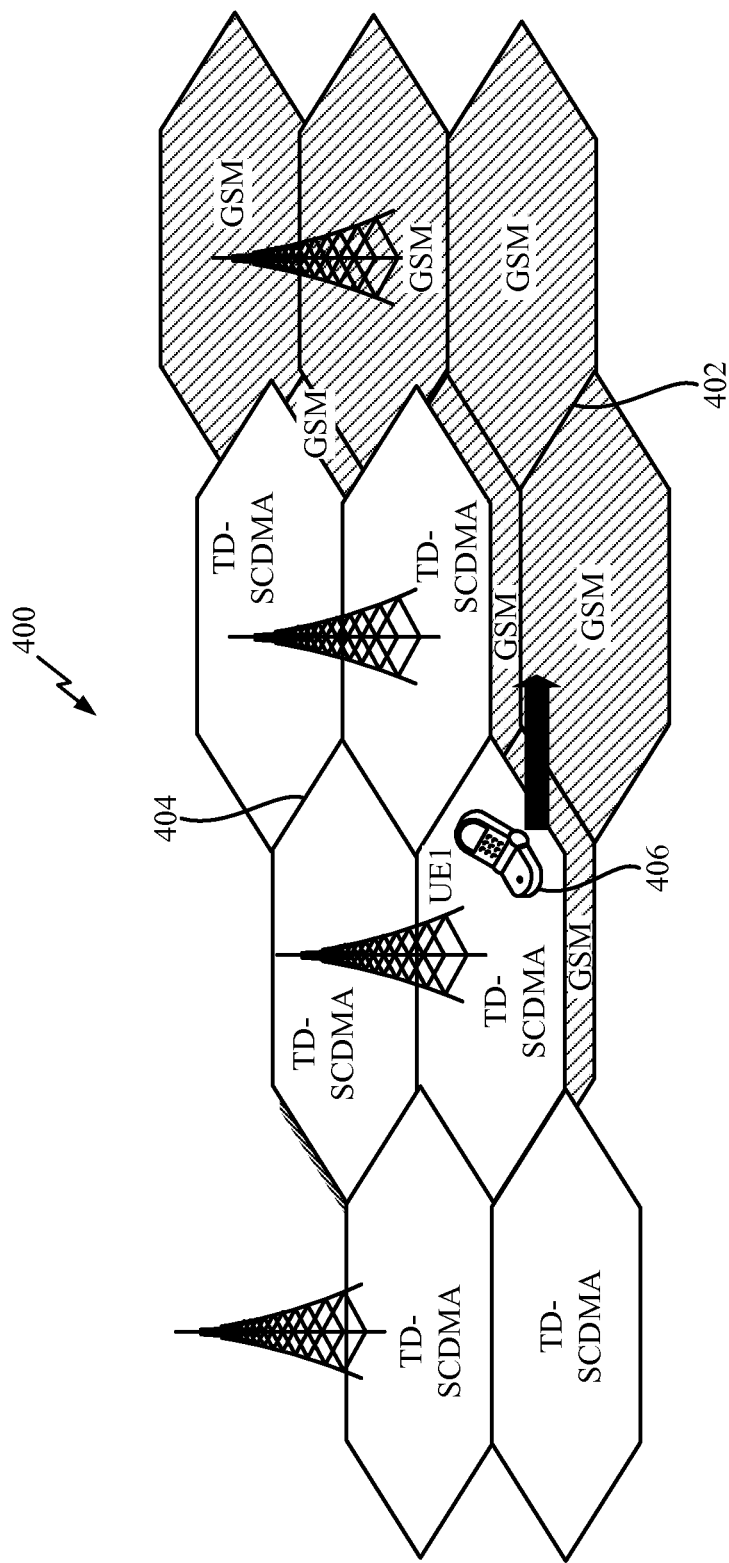
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The TD-SCDMA system is based on both time division and code division to allow multiple UEs 350 to share the same radio bandwidth on a particular frequency channel. The bandwidth of each frequency channel in a TD-SCDMA system is 1.6 MHz, operating at 1.28 Mega chips per second.

The downlink and uplink transmissions in a typical TD-SCDMA system share the same bandwidth in different time slots (TSs). In each time slot, there are multiple code channels. FIG. 2 illustrates an exemplary frame structure in TD-SCDMA. For example, the TD-SCDMA carrier has a frame that is 10 ms in length. Additionally, each frame has two 5 ms subframes, and each of the subframes includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink transmissions, which allows for greater flexibility during times of higher data transmission times in either the uplink or downlink directions. Between TS0 and TS1, there is a Downlink Pilot Time Slot (DwPTS) and Uplink Pilot Time Slot (UpPTS), separated by the gap. DwPTS is used to transmit DwPCH (Downlink Pilot Channel). The UpPTS is typically used for uplink synchronization, random access, and measurements for handoff.

In a system that has both TD-SCDMA coverage and GSM/Edge Radio Access Network (GERAN) coverage, there are times when a particular UE 350 will operate on one system and then switch to the other system. Such a switching between systems is called an inter-radio access technology (IRAT) handover (HO) between the two systems. Such handovers may be performed, e.g., for load balancing purposes, coverage holes in one network, or can be based on the type of communication desired by the UE 350.

Once the UE 350 has finished using one RAT (e.g., GERAN) and is ready to return back to TD-SCDMA (e.g., the UE 350 has completed a voice call, the signal strength on the GERAN system is inadequate, load balancing, or other reasons) the UE 350 "re-selects" or otherwise finds a frequency on the TD-SCDMA (or second RAT system) to enable return to the second RAT system (i.e., TD-SCDMA). Such a return may be referred to as a "fast return" (FR) or "standard fast return" when re-selections take place with assistance from the network. A normal reselection or standard fast return procedure for the UE 350 takes approximately ten to fifteen seconds to return to the TD-SCDMA system after a handover to the GERAN system.

The standard fast return process begins with the GERAN broadcasting frequencies of neighboring TD-SCDMA cells. During a GERAN voice call, the UE 350 performs neighboring cell measurements for each (or some) of the broadcasted frequencies. The UE then reports these measurements during the voice call. Based on the measurements, the GERAN can then direct the UE 350 to camp on a particular frequency of the TD-SCDMA network at call release. If the UE has moved, the frequency list may be outdated, in which case the GERAN specified frequency may be an inappropriate frequency at the time of call release. Moreover, compatibility issues may arise between the networks with the fast return process.

To overcome these issues, networks may deploy a pseudo fast return (PFR) as a supplementary solution to the standard fast return. If pseudo fast return is enabled, the UE 350 receives pseudo fast return information from the TD-SCDMA nodeB when in idle mode. The pseudo fast return information can be sent by overwriting the mapping information in the Cell Select Reselect Information within the System Information Block 3 (SIB3) message.

The pseudo fast return information may contain a TD-SCDMA Frequency List and a received signal code power (RSCP) threshold. The UE 350 updates the pseudo fast return information while performing system information updates. The pseudo fast return function is disabled when the SIB3 information does not contain pseudo fast return information.

If pseudo fast return information is present and available to a UE 350, the TD-SCDMA radio resource control (RRC) layer stores the last received pseudo fast return information when entering a cell dedicated channel (CELL_DCH) state (i.e., connected mode). The parameters are passed to the GERAN network during a TD-SCDMA to GERAN circuit switched handover (HO). The GERAN UE 350 performs a TD-SCDMA cell search and measurements in the dedicated channel mode (i.e., connected mode). The UE then forms an RSCP sorted list of top TD-SCDMA cells that contain TD-SCDMA cells exceeding the RSCP threshold.

The UE 350 disables pseudo fast return (Pseudo Fast Return) and follows standard fast return processing if the GERAN UE 350 receives TD-SCDMA cell and/or frequency information via a Neighbor Cell List after handover. The standard fast return is then activated where the UE 350 measures and reports TD-SCDMA cell information in the GERAN dedicated channel mode. The GERAN network may then send the reselection frequency and cell candidates for IRAT handover at call release.

As the call is released in the GERAN network, the UE 350 attempts to re-establish network connections via the frequencies and/or cells indicated by the fast return process. If pseudo fast return is enabled, the pseudo fast return information includes a list of cells and/or frequencies that exceed the RSCP threshold. The UE 350 sequentially attempts to re-establish connection with the TD-SCDMA network starting with the first frequency/cell in the pseudo fast return information and continues through the pseudo fast return information one by one until connection with the TD-SCDMA network is regained. Alternatively, or in conjunction with such an aspect of the present disclosure, the GERAN can send the TD-SCDMA neighbor information with the call release message when pseudo fast return (PFR) is disabled.

The UE 350, as it moves from one location to another, may perform handovers after entering a connected mode in the TD-SCDMA network. Thus, the frequency list carried in the last received pseudo fast return information may become outdated because the list is received when the UE is in idle mode. As such, without updates to the frequency list in the pseudo fast return information, as the UE 350 moves to a new location and then releases a call in the GERAN network, the UE 350 may not be able to locate good frequencies and/or neighboring cells that are appropriate candidates for IRAT hand over. In other words, listed frequencies and/or cells may not exceed the RSCP due to the possibly outdated pseudo fast return information. This may result in degraded pseudo fast return performance and/or even IRAT handover failures.

In one aspect of the present disclosure, the UE 350 maintains and/or updates the frequency list for pseudo fast return based on actual UE 350 measurements for both intra and inter frequency based on the UE 350 location within cells. Aspects of the present disclosure assist the UE 350 in avoiding a handover frequency that may be old due to location changes when the UE 350 performs a dedicated channel (DCH) handover, which may result in a pseudo fast return (PFR) failure in the UE 350 new location. Aspects of the disclosure can improve PFR performance of the UE 350 by reducing latency and improving success rate.

Figure 5:
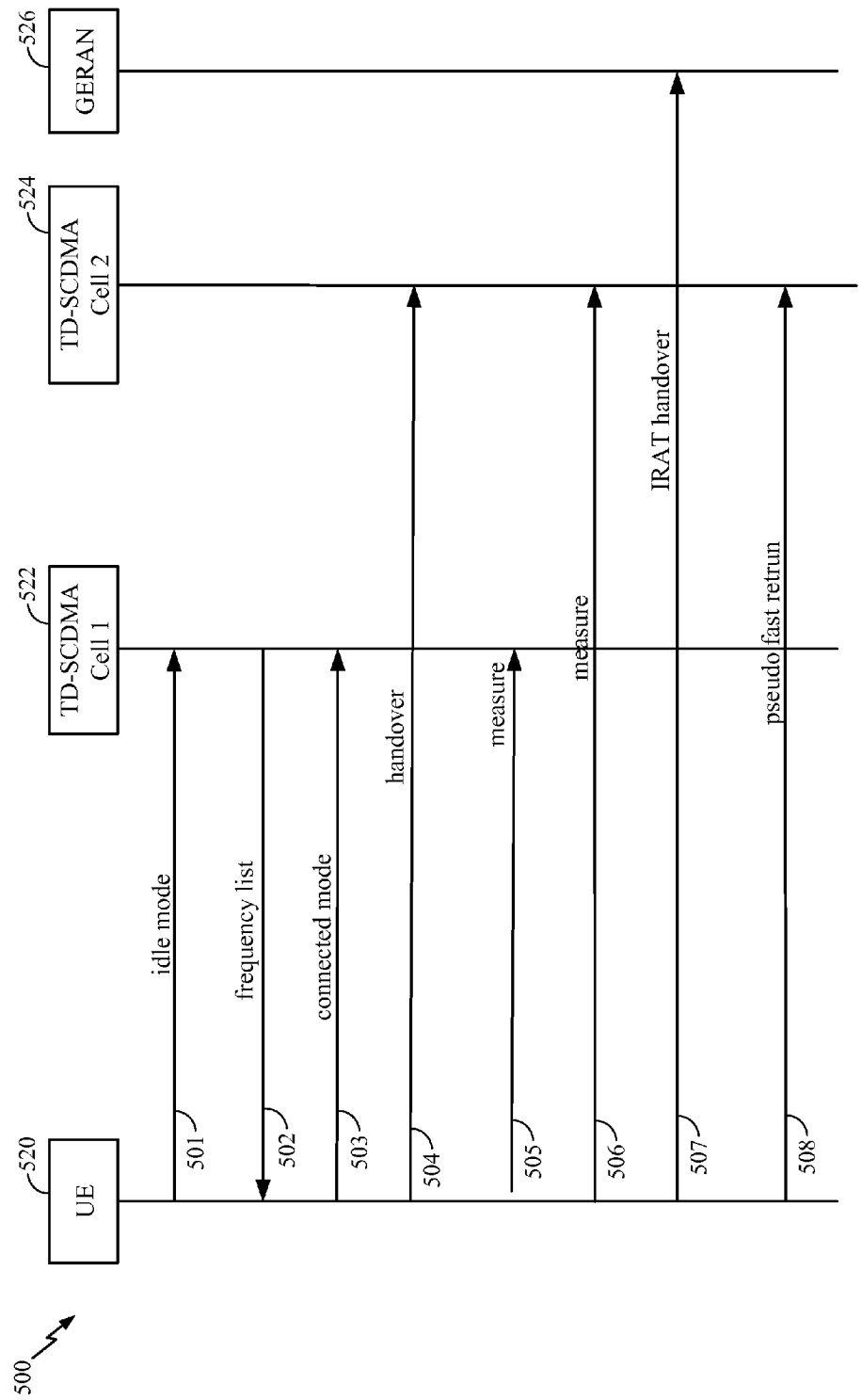
FIG. 5 is a call flow diagram illustrating the updating a frequency list according to an aspect of the present disclosure.

FIG. 5 is a call flow diagram showing an example of updating a frequency list for pseudo fast return when in connected mode, according to an aspect of the present disclosure. At time 501, a UE 520 is in idle mode and camped on TD-SCDMA cell 1 522. While in idle mode, the UE 520 receives a frequency list from TD-SCDMA cell 1 522 at time 502. At time 503, the UE 520 enters a connected state, for example in response to a voice call. At time 504, the UE 520 hands over from TD-SCDMA cell 1 522 to TD-SCDMA cell 2 524, for example due to mobility.

Once connected to TD-SCDMA cell 2 524, at times 505 the UE 520 measures the reference signal code power (RSCP), or some other signal metric of the first cell 522, both inter and intra frequency. The UE 520 also measures the RSCP or some other signal metric of the second cell 524, both inter- and intra-frequency, at time 506. The UE measures the signal metrics of all neighbor cells, but the call diagram only shows the measurement for two cells.

At time 507, the UE 520 hands over the call to a GERAN cell 526. Once the call releases, at time 508, the UE 520 returns to a TD-SCDMA cell based on the updated frequency list. The call flow diagram illustrates the UE 520 returning to the second TD-SCDMA cell 524. However, those skilled in the art will appreciate the UE 520 could also return to the first cell 522 after the call releases at the GERAN 526.

In another configuration, both a GERAN generated fast return list and a TD-SCDMA pseudo fast return list are provided. In this configuration, the UE selects from among the cells in both lists to locate a cell on which to camp.

Figure 6:
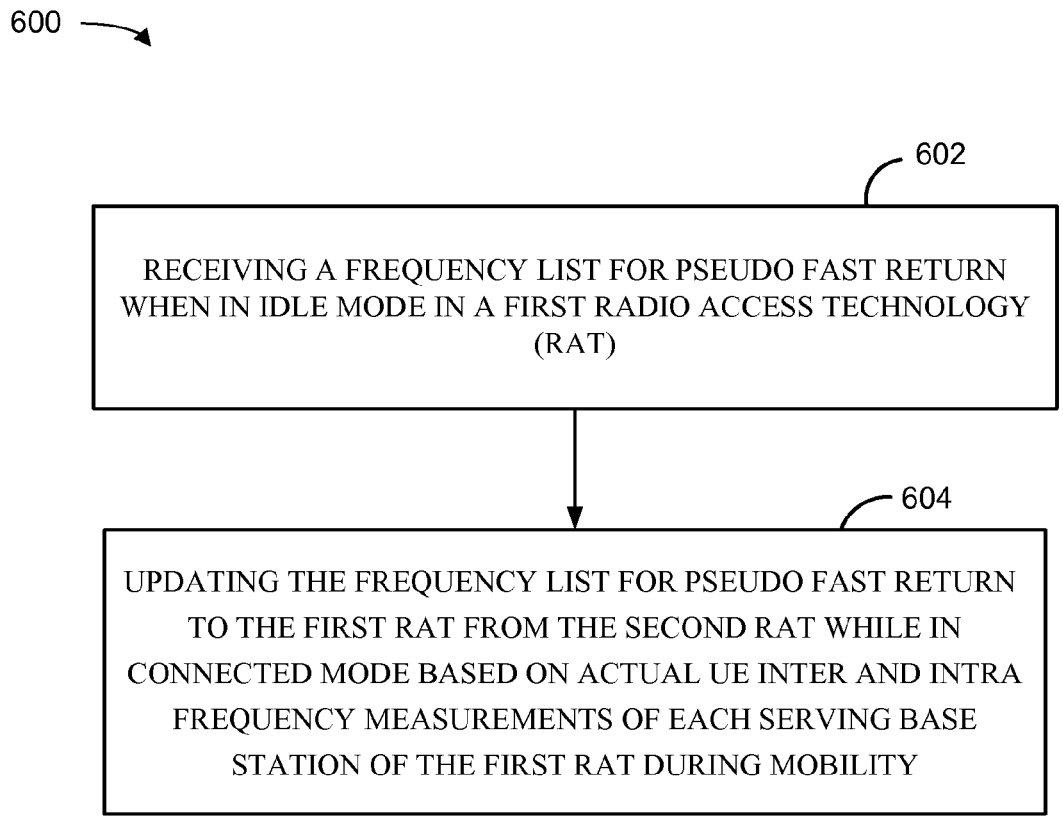
FIG. 6 is a block diagram illustrating a method for wireless communication according to an aspect of the present disclosure.

FIG. 6 shows a wireless communication method 600 according to one aspect of the disclosure. As shown in block 602, a UE 350 receives a frequency list for pseudo fast return when in idle mode in a first radio access technology (RAT). As shown in block 604, the UE 350 updates the frequency list for fast return to the first RAT from the second RAT while in connected mode. The updating is based on actual user equipment (UE) inter and intra frequency measurements of each serving base station of the first RAT during mobility.

Figure 7:
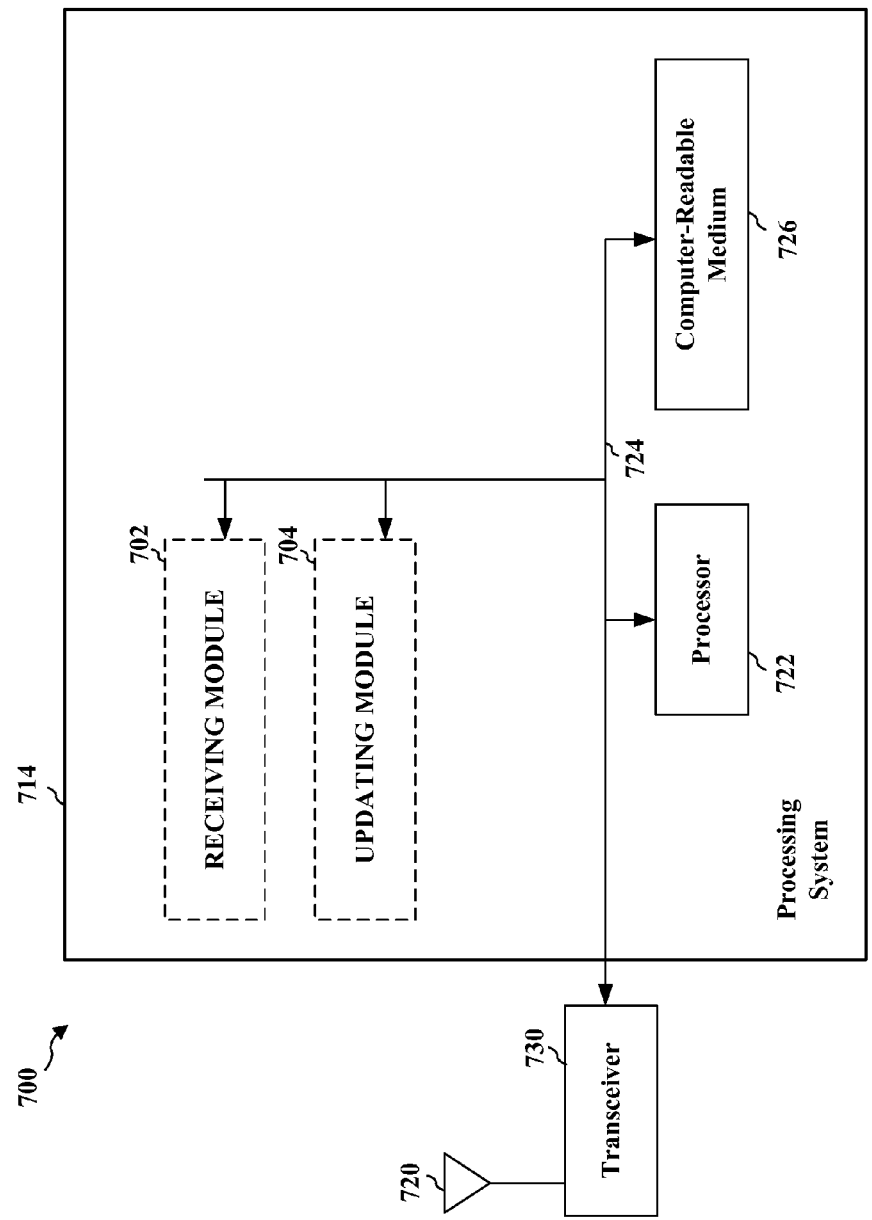
FIG. 7 is a diagram illustrating an example of a hardware implementation for an apparatus employing a processing system according to an aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 and the modules 702 and 704, and the computer-readable medium 726. The bus 724 may also link various other circuits such as timing sources, peripherals, voltage regulators, and power management circuits, which are well known in the art, and therefore will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a computer-readable medium 726. The processor 722 is responsible for general processing, including the execution of software stored on the computer-readable medium 726. The software, when executed by the processor 722, causes the processing system 714 to perform the various functions described for any particular apparatus. The computer-readable medium 726 may also be used for storing data that is manipulated by the processor 722 when executing software. The processing system 714 can include a module 702 for receiving a frequency list for pseudo fast return. The processing system 714 can also include a module 704 for updating the frequency list for pseudo fast return.

The modules 702 and 704 may be software modules running in the processor 722, resident/stored in the computer readable medium 726, one or more hardware modules coupled to the processor 722, or some combination thereof. The processing system 714 may be a component of the UE 350 and may include the memory 392 and/or the controller/processor 390.

In one aspect, the above means may be the antennas 352, the receiver 354, the channel processor 394, the receive frame processor 360, the receive processor 370, the transmitter 356, the transmit frame processor 382, the transmit processor 380, the controller/processor 390, the memory 392, module 391, module 702, module 704 and/or the processing system 714 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a frequency list for a pseudo fast return to a first radio access technology (RAT) at a user equipment (UE) when the UE is in idle mode in the first RAT; and
   updating the frequency list for the pseudo fast return of the UE to the first RAT from a second RAT when the UE is in connected mode in the first RAT, based at least in part on actual UE inter and intra frequency measurements of each serving base station of the first RAT during mobility of the UE.

2. The method of claim 1, in which the frequency measurements are of a complete frequency list stored in a UE subscriber identification module (SIM) card.

3. The method of claim 1, further comprising:
   receiving a network frequency list for a fast return when releasing a call in the second RAT; and
   selecting a frequency from among the updated frequency list and the network frequency list for returning to the first RAT.

4. The method of claim 3, in which the selected frequency is from the updated frequency list.

5. The method of claim 1, further comprising:
   releasing a call in the second RAT; and
   returning to the first RAT based on the updated frequency list.

6. The method of claim 1, in which the mobility is within the first RAT.

7. A computer program product for wireless communication in a wireless network, comprising:
   a non-transitory computer-readable medium having non-transitory program code recorded thereon, the program code comprising:

program code to receive a frequency list for a pseudo fast return to a first radio access technology (RAT) at a user equipment (UE) when the UE is in idle mode in the first RAT; and program code to update the frequency list for the pseudo fast return of the UE to the first RAT from a second RAT when the UE is in in connected mode in the first RAT, based at least in part on actual UE inter and intra frequency measurements of each serving base station of the first RAT during mobility of the UE.

8. The computer program product of claim 7, in which the frequency measurements are of a complete frequency list stored in a UE subscriber identification module (SIM) card.

9. The computer program product of claim 7, further comprising:

program code to receive a network frequency list for a fast return when releasing a call in the second RAT; and program code to select a frequency from among the updated frequency list and the network frequency list for returning to the first RAT.

10. The computer program product of claim 9, in which the selected frequency is from the updated frequency list.

11. The computer program product of claim 7, further comprising:

program code to release a call in the second RAT; and program code to return to the first RAT based on the updated frequency list.

12. The computer program product of claim 7, in which the mobility is within the first RAT.

13. A wireless communication apparatus, comprising:

at least one processor; and a memory coupled to the at least one processor; in which the at least one processor is configured:

to receive a frequency list for a pseudo fast return to a first radio access technology (RAT) at a user equipment (UE) when the UE is in idle mode in the first RAT; and to update the frequency list for the pseudo fast return of the UE to the first RAT from a second RAT when the UE is in connected mode in the first RAT, based at least in part on actual UE inter and intra frequency measurements of each serving base station of the first RAT during mobility of the UE.

14. The wireless communication apparatus of claim 13, in which the frequency measurements are of a complete frequency list stored in a UE subscriber identification module (SIM) card.

15. The wireless communication apparatus of claim 13, in which the at least one processor is further configured:

to receive a network frequency list for a fast return when releasing a call in the second RAT; and to select a frequency from among the updated frequency list and the network frequency list for returning to the first RAT.

16. The wireless communication apparatus of claim 15, in which the selected frequency is from the updated frequency list.

17. The wireless communication apparatus of claim 13, in which the at least one processor is further configured:

to release a call in the second RAT; and to return to the first RAT based on the updated frequency list.

18. The apparatus of claim 13, in which the mobility is within the first RAT.

19. A wireless communication apparatus, comprising:

means for receiving a frequency list for a pseudo fast return to a first radio access technology (RAT) at a user equipment (UE) when the UE is in idle mode in the first RAT; and means for updating the frequency list for the pseudo fast return of the UE to the first RAT from a second RAT when the UE is in connected mode in the first RAT, based at least in part on actual user equipment (UE) inter and intra frequency measurements of each serving base station of the first RAT during mobility of the UE.

20. The wireless communication apparatus of claim 19, in which the frequency measurements are of a complete frequency list stored in a (UE) subscriber identification module (SIM) card.

21. The wireless communication apparatus of claim 19, further comprising:

means for receiving a network frequency list for a fast return when releasing a call in the second RAT; and means for selecting a frequency from among the updated frequency list and the network frequency list for returning to the first RAT.

22. The wireless communication apparatus of claim 21, in which the selected frequency is from the updated frequency list.

23. The wireless communication apparatus of claim 19, further comprising:

means for releasing a call in the second RAT; and means for returning to the first RAT based on the updated frequency list.

24. The apparatus of claim 19, in which the mobility is within the first RAT.

* * * * *